United States Patent Office 3,113,119
Patented Dec. 3, 1963

3,113,119
PREPARATION OF BLACK MASTERBATCH
Robert A. Forrester, Baytown, Tex., assignor, by mesne assignments, to Ashland Oil & Refining Company, Ashland, Ky., a corporation of Kentucky
No Drawing. Filed Oct. 10, 1960, Ser. No. 61,339
6 Claims. (Cl. 260—41.5)

This invention relates to the preparation of synthetic rubber. More particularly, it relates to the preparation of carbon black rubber masterbatches. Still more particularly, it relates to the preparation of carbon black synthetic rubber masterbatches in which carbon black is incorporated in synthetic rubber latices prior to coagulation.

In the manufacture of rubber compositions, carbon black is usually dispersed in rubber by any of several methods. One of these methods is dry mixing in conventional mechanical mixing devices such as frictional roll mills or internal mixers. This method, however, when applied to synthetic rubber, is subject to certain disadvantages. For instance, it requires a first mixing to prepare a dry-mixed carbon black rubber masterbatch. Following this, a second mixing is required to incorporate the remaining compounding agents in the masterbatch. The necessity for two separate mixes involves considerable power consumption. Power requirements, moreover, are further aggravated since certain synthetic rubbers, particularly butadiene-styrene rubbers, are inherently resistant to breakdown by milling.

A second method, far less demanding from a power standpoint than dry mixing, comprises forming a carbon black-latex masterbatch followed by coagulation of the latex. This method has been practiced in various ways, all of which are subject to any of certain difficulties. The addition of dry carbon black directly to latex as heretofore practiced, for example, has proved generally to give a relatively poor dispersion of black in the rubber. To overcome this, the use of water slurry of black has been employed, but the resultant dispersion in the rubber is still not as good as that obtained by dry mixing. For some reason, moreover, wetting carbon black with water followed by drying appears to have a degrading effect on the modulus of the rubber. Perhaps the most practical means of incorporating carbon black in latex has been by adding to latex a water slurry of carbon black prepared with a chemical dispersing agent. In this modification, however, the use of salt is generally employed in coagulating the latex with no apparent quality improvement of the final product because of the presence of water soluble ash. While other means have been proposed for forming aqueous carbon black slurries, these also are subject to the disadvantages generally associated with aqueous carbon black slurries.

It is apparent, therefore, that a method of preparing well dispersed carbon black synthetic rubber masterbatches not subject to the disadvantages of either dry mixing or latex masterbatching would be highly desirable. Although efforts have been made in recent years along these lines, nevertheless, none has proved wholly satisfactory. Accordingly, there continues to remain a demand for such a method.

It is a principal object of this invention, therefore, to fulfill this demand. It is a further object of this invention to prepare a carbon black-synthetic rubber masterbatch not subject to the disadvantages of masterbatches as heretofore prepared. It is a still further object of this invention to provide a method of latex masterbatching without the use of a chemical dispersing agent. An additional object of this invention is to provide a masterbatch demonstrating improved compounding characteristics over masterbatches prepared by known methods. Another object of this invention is to provide a process which is simple, efficient and which may be readily practiced in conventional latex processing equipment.

Surprisingly, particularly in view of previous efforts in latex masterbatching, these objects have been met by a process which is simple, yet unusually effective. In general, the method of this invention, to the extent that it comprises the addition of dry carbon black directly to latex, is similar to the prior art. However, where such addition in the past comprised a mere bringing together of black and latex followed by moderate agitation, addition of the black, according to the instant invention, is made to a body of latex which has previously been caused to flow in a predetermined pattern. Thus, it has been found that if the flow of latex is controlled so as to establish and maintain a vortex, a uniform dispersion of black therein may be readily obtained. The latex masterbatch so formed may then be treated by known procedures and in conventional equipment to obtain a uniformly dispersed black-rubber masterbatch.

Although the method of this invention is particularly applicable to the preparation of black masterbatches comprising styrene-butadiene polymers, nevertheless, it is just as applicable to the preparation of masterbatches comprising other synthetic latices. By the latter is meant those latices formed by emulsion polymerization using a soap type emulsifier such as a rosin acid or fatty acid soap. Illustrative of such latices are those formed by the polymerization of such monomers as butadiene-1,3, methyl-2-butadiene-1,3, chloro-2-butadiene-1,3, piperylene-2,3-dimethyl butadiene-1,3, and the like as well as mixtures thereof. Also intended to be included are those latices formed by the polymerization of a butadiene-1,3 with one or more compounds polymerizable therewith containing a terminal $CH_2C<$ group. Examples of such compounds are aryl olefins including styrene mentioned above, such as α-methyl styrene, p-chlorostyrene and the like; and the α-methylene carboxylic acids, their esters and nitriles such as acrylic acid, methylacrylate, methylmethacrylate, acrylonitrile, methacrylonitrile, methylvinyl ether, methylvinyl ketone and the like.

The method of this invention is particularly directed to the preparation of black masterbatches in which the black is a highly reinforcing furnace black. The method is just as applicable, however, to the preparation of masterbatches comprising other grades of carbon black. The method, moreover, may be employed in the preparation of oil-extended black masterbatches as well as in the preparation of those not bearing an extender oil. In the preparation of an oil-extended product, the extender oil may be any oil normally employed for this purpose, the particular oil comprising no part of this invention.

As previously described, the method of this invention comprises imparting to a confined body of a synthetic latex, to which the dry black is to be added, a rotational velocity sufficient with respect to the volume of said body to establish a vortex. Quite unexpectedly, on the addition of black to the controlled flowing body, dispersion is thoroughly and rapidly obtained. Exactly why a flowing body of latex of this nature so advantageously influences the incorporation of black into the latex is not clearly understood. Nevertheless, it is apparent that the method of the present invention results in a thorough distribution of the carbon black throughout the latex permitting the black to become associated with the rubber thus avoiding lumps on coagulation. Although there is no desire to limit this invention by any particular theory of operation, it may be that the centrifugal and centripetal forces exerted by the rotationally flowing fluid on the particles of black of varying diameter influence their thorough and rapid distribution through the latex. Whether the flow of latex is controlled so as to create a vortex opening vertically downwardly or otherwise appears to be immaterial in obtaining the desired result. From a practical standpoint, however, it would appear that the formation of a vortex opening downwardly would be most satisfactory.

The particular means employed for establishing and maintaining a vortex within the body of latex may be varied. One suitable means, for instance, may be any of various conventional and commercially available mechanical agitators appropriately positioned within the body of latex and controlled as to speed of rotation. Another means for creating the vortex particularly adaptable to a continuous method comprises the introduction of latex into a confined space under sufficient force and in sufficient volume as to produce a vortex. In such an arrangement, of course, the dimensions of the confined space considered along with other factors must be such as to provide the necessary residence time within the confined space as to obtain the desired distribution of black through the latex. The angular velocity of the introduced latex need only be sufficient to create a vortex opening away from the point of latex introduction. Angular velocities high enough to create an inverted vortex are unnecessary and undesirable. The particular means for introducing latex under sufficient pressure and volume described in this variation may take various forms as, for example, a tangentially positioned conduit, a conduit spiralling about the axis of the confined space, or the like. While it is conceivable that the method of this invention may be practiced by rotating an enclosed vessel so as to create a vortex as in a centrifuge, the profile of such a vortex is the reverse of those formed by the above described means and is not as well suited to obtain the desired distribution.

Once the flow of latex has been adjusted to establish the desired vortex, carbon black is added thereto. It is highly desirable to add the black in such a manner as to avoid "bridging" of the vortex. When this is not avoided, particularly when maintaining a vertically disposed vortex, black drops to the bottom of the vortex and is not properly subjected to the forces exerted by the rotatingly flowing latex. Accordingly, for optimum results, the black should preferably be added to the surface of the latex adjacent the vortex at its largest cross section. The black when added is in a finely divided form preferably having been subjected to pulverization in conventional equipment if originally in pellets. Although the method of this invention may be practiced on pelleted black with excellent distribution thereof through the latex, because of its mass pelleted black is subject to considerable drop-out prior to coagulation if adequate agitation is not maintained. For the purposes of this invention, therefore, finely pulverized black is preferred. In either case, however, black is added in sufficient quantity to provide the desired loading in the final product by means of a metering device or equivalent means. When pulverization of the black comprising a step in a continuous process, the rate of pulverization of the black must necessarily be maintained constant to insure a uniform of black loading in the latex.

A preferred mode of operating the method of the instant invention is to first subject the latex to at least a partial creaming prior to the addition of the dry carbon black. This appears to produce an even superior distribution of black than when the latter is added to uncreamed latex. It is not cleary understood why this should occur, but apparently it is the greater viscosity of the creamed latex that beneficially affects the black distribution. Creaming of the latex may be conducted in a manner similar to that conventionally followed. The addition of any of the known creaming agents such as sodium chloride, zinc chloride, alum and the like may be employed. Creaming may be conducted prior to formation of the vortex or after the vortex is created.

Once the vortex has been established and the black added, a uniform dispersion of black in the latex is rapidly obtained. Generally, the time required to obtain the desired results does not exceed about two minutes and is usually considerably less. Once the operation is complete, the dispersion is further treated in conventional manner to coagulate the latex as by the addition of salt and/or acid. Creaming is usually practiced even though there may have been a pre-creaming and even though the addition of black itself has a creaming effect.

The following examples further describe the invention. These examples are intended to be illustrative only and not by way of limitation. Unless otherwise indicated, all parts are by weight.

EXAMPLE 1

40 parts of a styrene-butadiene rubber latex comprising 20% solids are placed in an open top container and caused to flow by mechanical agitation so as to establish and maintain a vortex. To the latex are then added 4 parts of dry micro-pulverized HAF carbon black. Addition of the carbon black is made to the liquid face of the vortex in a manner so as to avoid bridging of the vortex. A uniform dispersion is rapidly obtained which is then coagulated in a conventional manner using dilute brine and sulfuric acid such that the pH of coagulation is maintained at 3.0–3.5.

EXAMPLE 2

The procedure of Example 1 is repeated except that the rotatingly flowing body of latex is subjected to a pre-creaming step by the addition thereto of 2.5 parts of a 10% brine solution. To the thickened latex is added 4 parts of a HAF carbon black and the resultant dispersion coagulated as in Example 1.

EXAMPLE 3

The HAF carbon black of Example 1 is dispersed in water to form a 15% aqueous slurry using 1.2% on the weight of the black of Marasperse CB (a partially disulfonated sodium lignosulfonate) dispersing agent. A sufficient amount of the black dispersion is then added to 40 parts of the 20% latex of Example 1 to provide a similar ratio of black to polymer. The latex masterbatch is then passed through a homogenizing unit and coagulated as in Example 1.

EXAMPLE 4

A black masterbatch is obtained by mixing 50 parts of the dry HAF carbon black of Example 1 and 100 parts of a styrene-butadiene rubber obtainable from a white latex as in Example 1 in a Banbury until a uniform dispersion of black in the rubber is obtained.

EXAMPLE 5

Samples of the products of Examples 2, 3 and 4 are made into compositions according to the following recipe by mixing in a Banbury.

| Constituent: | Parts |
| --- | --- |
| Black masterbatch | 150 |
| Sulfur | 2.0 |
| Zinc oxide | 1.5 |
| Benzothiazoledisulfide | 1.5 |

Samples of the three compositions are then cured at 293°

F. for periods of 30, 45, 60 and 90 minutes and then tested. Results appear in Table I.

*Table I*

| Test | Time | Ex. 2 | Ex. 3 | Ex. 4 |
|---|---|---|---|---|
| Modulus 300% (p.s.i.) | 30 | 1,470 | 900 | 1,120 |
|  | 45 | 1,900 | 1,460 | 1,590 |
|  | 60 | 2,020 | 1,620 | 1,750 |
|  | 90 | 2,070 | 1,840 | 1,870 |
| Tensile Strength (p.s.i.) | 30 | 3,570 | 2,900 | 3,200 |
|  | 45 | 3,570 | 3,500 | 3,270 |
|  | 60 | 3,570 | 3,570 | 3,640 |
|  | 90 | 3,510 | 3,640 | 3,570 |
| Elongation percent | 30 | 575 | 700 | 640 |
|  | 45 | 490 | 550 | 500 |
|  | 60 | 460 | 510 | 520 |
|  | 90 | 460 | 485 | 485 |
| Angle Abrasion (gms. loss/hr.) | 90 | 12.4 | 15.2 | 14.0 |

The above data show the product prepared according to the present invention (Example 2) to have superior modulus and abrasion values than do the products prepared by dry mixing (Example 4) and wet mixing using a dispersing agent (Example 3), while tensile and elongation are substantially equivalent. In addition, the method by which the product of Example 2 is prepared is not subject to the disadvantages inherent in the methods by which the products of Examples 3 and 4 are prepared.

While the examples illustrate the application of the present invention to a particular latex and a particular black, it should be understood, as previously described, to be as applicable to other latices and other blacks.

I claim:

1. A method of preparing a carbon black-synthetic rubber masterbatch which comprises: imparting to a body of synthetic latex prepared by the emulsion polymerization of a member selected from the group consisting of a conjugated diolefin and a conjugated diolefin together with at least one other monomer polymerizable therewith a rotational velocity sufficient with relation to the volume of said body to establish a vortex; introducing substantially dry carbon black into said latex by adding it to the surface thereof adjacent the largest cross sectional area of said vortex; maintaining said vortex until said carbon black is uniformly dispersed throughout said latex; and further treating said carbon black loaded latex to obtain a carbon black-synthetic rubber masterbatch.

2. A method according to claim 1 in which the synthetic latex is a styrene-butadiene latex.

3. A method according to claim 1 in which the latex is at least partially creamed prior to the addition of carbon black.

4. A method according to claim 1 in which the carbon black is in pelleted form.

5. A method according to claim 1 in which the carbon black is in finely divided form.

6. A carbon black latex masterbatch prepared according to the process of claim 1.

References Cited in the file of this patent

UNITED STATES PATENTS

| 2,419,512 | Vesce | Apr. 22, 1947 |
| 2,441,090 | Te Grotenhuis | May 4, 1948 |
| 2,560,235 | McGavack et al. | July 10, 1951 |
| 2,658,049 | Adams | Nov. 3, 1953 |

UNITED STATES PATENT OFFICE
CERTIFICATE OF CORRECTION

Patent No. 3,113,119  December 3, 1963

Robert A. Forrester

It is hereby certified that error appears in the above numbered patent requiring correction and that the said Letters Patent should read as corrected below.

Column 2, line 42, for "$CH_2C{<}$ group" read -- $CH_2{=}C{<}$ group --.

Signed and sealed this 22nd day of March 1966.

(SEAL)
Attest:

ERNEST W. SWIDER
Attesting Officer

EDWARD J. BRENNER
Commissioner of Patents